J. R. M. STANFIELD.
SPRING SUSPENSION OF VEHICLES.
APPLICATION FILED JAN. 5, 1922.
1,427,240. Patented Aug. 29, 1922.
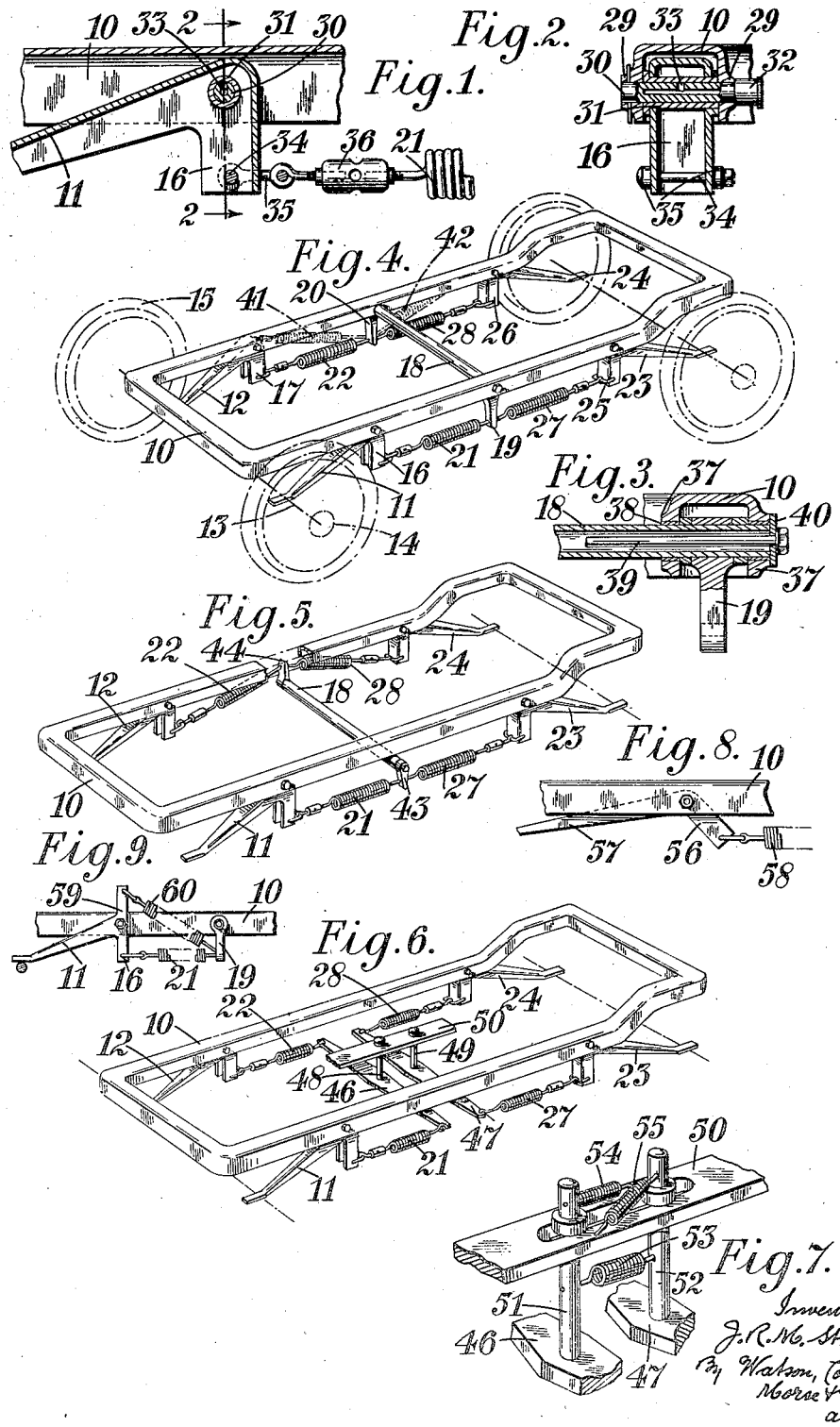

UNITED STATES PATENT OFFICE.

JOSEPH REGINALD MONTAGUE STANFIELD, OF CARDIFF, WALES, ASSIGNOR OF ONE-HALF TO JOHN FIFIELD ADYE, OF BRENTWOOD, DINAS POWIS, WALES.

SPRING SUSPENSION OF VEHICLES.

1,427,240.            Specification of Letters Patent.      Patented Aug. 29, 1922.

Application filed January 5, 1922. Serial No. 527,147.

*To all whom it may concern:*

Be it known that I, JOSEPH REGINALD MONTAGUE STANFIELD, a subject of the King of England, residing at Cardiff, Wales, have invented certain new and useful Improvements in the Spring Suspension of Vehicles, of which the following is a specification.

This invention is for improvements in or relating to spring-suspension means for vehicles of the type wherein each wheel is supported on one end of a lever, for example, a bell-crank lever, which is pivoted to swing in a vertical plane, and the other end of the lever is engaged with a cushioning spring, which spring is itself engaged with an abutment or anchorage. Heretofore this abutment or anchorage has been rigidly secured to the vehicle frame, but in the various embodiments of this invention, hereinafter described, the abutment is movable relatively to the frame of the vehicle.

According to this invention there is provided in a spring-suspension for a vehicle, the combination with levers, (for example, bell-crank levers) disposed lengthwise of the vehicle and allocated one to each wheel, and springs engaged with said levers, of an anchorage for the springs comprising a rocking-shaft disposed transversely to the vehicle-frame intermediate of its ends and formed at each end with a radial arm whereto the springs on one side of the vehicle are anchored. In one construction the radial arms aforesaid are disposed on opposite sides of the axis of the rocking-shaft, so that the two springs operative on the two wheels at one end of the vehicle act on their anchorage in opposition to one another.

In a modified construction, the anchorage for the two springs at one end of the vehicle comprises a lever pivoted at the middle of its length and having the springs connected respectively to its opposite ends. In such a construction two separate rocking-levers may be provided, one for the two springs at one end of the vehicle and the other for the two springs at the other end of the vehicle, and according to a further feature of the invention the pivot pins for these two rocking-levers may be movable towards and away from one another, being resiliently connected together. In the accompanying drawings, Figures 1, 2 and 3 are sectional views showing certain details of construction;

Figure 4 is a perspective view showing diagrammatically one arrangement of springs in accordance with this invention;

Figure 5 is a similar view showing a modified arrangement of springs;

Figure 6 is a similar view showing another modified arrangement of springs;

Figure 7 shows to a larger scale than Figure 6 a modified construction of a portion thereof, and—

Figures 8 and 9 show modified constructions of other parts.

Like reference characters indicate like parts throughout the drawings.

Referring first to the particular embodiment of this invention illustrated diagrammatically in Figure 4, the frame 10 of the vehicle has pivotally mounted on it near its front end, a pair of bell-crank levers 11, 12. These levers extend lengthwise of the vehicle forwardly from their pivot-pins, and the front axle of the vehicle is mounted on the free forward ends of these levers, the front axle and front wheels being indicated in chain lines at 13, 14, 15 respectively. The short arms of the levers 11, 12 are indicated at 16, 17 respectively and they are arranged to lie in an approximately vertical position.

About the middle of the length of the frame 10 there is mounted a shaft 18 extending transversely across the frame and adapted to rock about its own longitudinal axis in suitable bearings in the frame. This shaft 18 is provided with downwardly-depending arms 19, 20 respectively, and these arms are connected by coiled springs 21, 22 respectively to the arms 16, 17 of the levers 11, 12.

A similar pair of bell-crank levers 23, 24 are provided for the rear wheels of the vehicle, and the downwardly-depending arms 25, 26 of these levers are also connected to the arms 19, 20 aforesaid by coiled springs 27, 28 respectively.

The detailed construction of certain of these parts is illustrated in Figures 1, 2 and 3, Figure 2 being a section on the line 2—2 of Figure 1. Referring to Figures 1 and 2, the frame 10 of the vehicle, or each of the side members thereof, is constituted by a member of inverted U-section as shown most clearly in Figure 2. The bell-crank lever 11, 16, is of similar section, and is pivotally mounted in the frame 10 as is also shown in Figure 2. The frame 10 is provided with bosses 29 on either side of it, and these bosses are bored to receive a pin 30. A sleeve 31 of brass or other suitable anti-friction metal is mounted on the pin 30 and the bell-crank lever 11, 16 is bored to fit this bush. The pin 30 is conveniently hollow, being bored from one end and a grease-box 32 or other suitable device supplies lubricant to the interior of the pin and through a lateral opening 33 therein to the interior of the bearing-bush 31, thus providing lubrication for the rotative movement of the bell-crank lever 11, 16 with respect to the frame 10.

The lower end of the arm 16 is provided with a pin 34 whereto is affixed a shackle 35, and a turnbuckle 36 constitutes the connection between the shackle 35 and the spring 21 aforesaid. Similar turnbuckles are provided on all the springs and they provide a convenient means for individually adjusting the tension of the springs.

Figure 3 shows the mounting of the transverse rocking-lever 18 in the side-frames 10. The frame 10 is provided with bosses 37 to give the requisite length of bearing, and these are bushed at 38 to receive the shaft 18 within them. The arm 19 is keyed or otherwise non-rotatively secured on the shaft 18 within the frame-member 10, and the shaft 18 is retained in position by any convenient fastening. As illustrated, a tie-bolt 39 extends through the shaft and is provided with washers 40 bearing against the outer side of the frame-member 10. Any suitable means may be provided for lubricating the bearing surfaces of the shaft 18 in the bushes 38.

With regard to the operation of the system of springs illustrated in Figure 4, it will be seen that all the springs are anchored to the arms on the rocking-shaft 18 so that a variation in the tension of one spring affects all the other springs, since the equilibrium of the shaft 18 is maintained by the springs acting in opposition to one another. Thus for example if, when the vehicle is in motion, the wheel 14 encounters a pothole, the tension in the spring 21 is reduced whilst the wheel is falling. The arm 19 is therefore free to swing towards the rear, rotating the shaft 18 and carrying with it the arm 20. The tension in the two springs 27, 28 is thereby reduced whilst the tension in the spring 22 is increased. The effect therefore of the wheel 14 being unsupported is to let its corner of the frame, and the whole of the other end of the frame, tend to fall so that the movement of the frame instead of being localized at the point of support of the wheel concerned is distributed and thereby reduced.

If it is desired, additional springs as shown in chain lines at 41, 42, and similar springs on the other side of the vehicle may be provided, anchoring the ends of the arms 20 and 19 respectively to the frame 10. These springs provide an additional resistance to rotation of the shaft 18, but they operate independently of the wheels since they are not connected to the bell-crank levers which carry the wheel-axles.

Another arrangement of additional springs is illustrated in Figure 9. The arm 16 of the bell-crank lever is provided with an upward extension 59 on the other side of its pivot-pin, and a spring 60 is connected to this arm and to the arm 19 on the transverse rocking-shaft. The arms 16, 59 on the bell-crank lever may be of equal length and in line with one another, and the springs 21, 60 of different strengths so as to produce a damping effect on the oscillations of the bell-crank lever. Alternatively the arms may be of unequal length and arranged at different angles in which case a damping effect is produced on that individual bell-crank lever and also on the whole compensating system, depending upon the lengths and angles for the two arms.

An important advantage of this construction, and also of the other constructions hereinafter described, is that the coiled springs which are used operate without any friction, such as is obtained with the usual form of leaf-springs, and the whole system of springing is thereby rendered more sensitive without sacrificing the requisite strength in the springs.

In the arrangement of springs illustrated in Figure 5, the construction is similar to that illustrated in Figure 4, except that the arms 43, 44, on the transverse rocking-shaft 18 extend radially on opposite sides of the axis of the shaft instead of both depending therefrom as in Figure 4. The springs 21, 22, 27 and 28 are connected in the same way as before between the respective bell-crank levers 11, 12, 23, 24, and the arms 43, 44. It will be seen that with this arrangement the two springs for the two front wheels, or for the two rear-wheels, act on the transverse rocking-shaft in opposition to one another. Thus the tension in the spring 21 tends to rotate the shaft in the opposite direction to the tension in the spring 22, so that these springs may be regarded as balancing one another. Obviously, however, since all the springs are connected to the rocking-shaft 18, this may not accurately define the balancing of the springs, since the final condition is that the total effect of the springs 21, 28 is balanced by the total effect of the springs 22, 27 when the whole system is in equilibrium.

In the operation of this arrangement of springing a variation in the tension in one spring effects all the other springs, but not in the same way as was described with reference to Figure 4. Assuming that the tension in the spring 21 is reduced, by the wheel to which it is allocated encountering a pot-hole, the arm 43 is partially released to move backwards rocking the shaft 18. The tension in the springs 22 and 27 is thereby reduced and the tension in the spring 28 is increased. The resultant effect therefore is that if one wheel encounters a pot-hole the tension of the spring of the other wheel at the same end of the car is reduced and that end of the frame is allowed to move down slightly, thereby conducing to smooth running of the vehicle.

As stated above, the construction illustrated in Figure 5 may be considered as one in which the springs 21, 22 balance one another, and also the springs 27, 28 balance one another, and this effect may be ensured by providing two separate transverse shafts, one for each pair of springs.

Instead of the rocking-shaft 18 of Figure 5, a similar effect may be obtained by the use of a rigid lever extending across the vehicle, pivoted at the middle of its length and having the springs connected to its opposite ends: Figure 6 shows such a construction in which two separate levers are provided, one for the springs for the front wheels of the car, and the other for the springs for the rear wheels of the car. The bell-crank levers 11, 12, 23, 24 with their springs 21, 22, 27 28, are similar to the previously-described constructions, but the anchorage for these springs comprises levers 46, 47 which are each pivoted at the middle of its length on pins 48, 49 carried by a member 50 rigidly secured to the frame 10 of the vehicle.

It has previously been proposed to employ a system of springing wherein two rigid or spring levers are disposed across a vehicle and are pivotally connected to one another at their centres. The extremities of one of the levers are connected, through suitable tie rods and bell crank levers, to the springs supporting the front wheels of the vehicle or in the case of spring levers directly to the axle which is vertically guided, while the extremities of the other lever are connected through similar means to the back wheels.

It will be appreciated however in the construction last described, according to this invention, that the levers which are disposed across the vehicle are rigid and that the spring suspension is provided by the springs connecting the extremities of the said levers to the wheel-carrying levers.

This arrangement affords easy access to the springs whereby adjustment or replacement of the same may be quickly carried out, since the springs are disposed along the side of vehicle instead of extending beneath and across the vehicle as heretofore proposed.

It will be seen that with the present construction any variation in the tension of one of the springs, say 21, enables its lever 46 to rock and produce a similar and equal variation in the spring 22 which is connected to the corresponding wheel at the same end of the vehicle. The result is that if one wheel encounters an obstacle or a pot-hole, the resulting change in the tension in its spring produces a corresponding change in the tension for the other wheel at the same end of the car, so that the whole end of the car rises or falls uniformly. The other end of the car is unaffected, when two separate levers are used as illustrated. If only one lever were used instead of the two levers 46, 47, the operation of this construction would be exactly similar to that illustrated in Figure 5.

In another construction of this invention the arrangement illustrated in Figure 6 is modified as shown in Figure 7. This figure shows the frame-member 50 which carries the pivot-pins for the two rocking-levers, but these pivot-pins 51, 52 are so mounted that they can move towards and away from one another and they are coupled by a tension-spring 53. With this construction the four springs 21, 22, 27, 28 for the four wheels are all interconnected and the system is such that the two springs 21, 22 balance one another, (by appropriately rocking their lever 46), the two springs 27, 28 similarly balance one another, and the total pull of the two springs 21, 22 on their pivot-pin 51 balances through the spring 53 the total pull of the two springs 27, 28 on their pivot-pin 52.

The result of this construction is that if tension in any one spring is varied, a similar variation is produced in all the other springs. Thus, if the tension in the spring 21 is reduced, the tension in the spring 22 is correspondingly reduced by movement of the member 46. The total pull on the pivot-pin 51 of that lever is therefore reduced and the tension in the spring 53 is reduced so that the pivot-pin 52 is free to move and produce a corresponding reduction in the tension in the springs 27, 28. Since the springs themselves are frictionless the only friction in the whole system is that of the rotation of the levers on their pivot-pins and of the translational movement of those pivot-pins, so that any variation in the tension of one spring immediately causes an equal variation in the same sense in the tension of all the other springs, and any shock to one wheel of the vehicle is distributed uniformly over the whole vehicle, thereby ensuring very smooth running.

With this construction, the whole spring system of levers, springs and bell-crank levers is free relatively to the frame 10, and it is desirable to provide an anchorage for the system. This is conveniently effected by means of springs 54, 55 which anchor the pivot-pins 51, 52 respectively to the frame-member 50. It will be seen that these springs act in conjunction with the spring 53 aforesaid to balance the pull of the springs 21, 22 or 27, 28.

An important modification that is applicable to any of the constructions hereinbefore described is illustrated in Figure 8. As there shown, the short arm 56 of the bell crank, i. e. the arm to which the spring is attached, is so disposed relatively to the other arm that it is normally at an obtuse angle with the axis of the spring when the vehicle is not loaded. With this arrangement an upward movement of the wheel-carrying arm 57, such as would tension the spring 58, brings the arm 56 more nearly at right-angles to the line of action of the spring and thereby increases the leverage of the spring on the bell-crank. Also any given angular movement of the bell-crank imparts a smaller tension to the spring, when the spring is heavily loaded. The total result therefore is that the loading of the spring, and its turning moment on the bell-crank increase at a greater rate than the increase of the loading on the arm 57 which causes such movement. This is equivalent to increasing the strength of the spring as the load comes on it.

It will be appreciated that it is not necessary to mount the wheels on bell-crank levers, since similar results could be obtained by using plain levers and appropriately arranging the springs; thus, for example, with plain levers the tension-springs could be arranged to lie vertically and the transverse rocking-levers would then oscillate in a vertical plane. To provide the necessary connections between the rocking-levers, they could each be mounted on a lever pivoted intermediate of them. Such arrangements, however, would usually occupy more space than is conveniently available for the spring system and the various constructions hereinbefore described in which the springs lie horizontally of the vehicle are considered preferable.

These and other modifications in the details of construction are all held to lie within the scope of the present invention as set forth in the appended claims:

What I claim as my invention and desire to secure by Letters Patent is:

1. A spring-suspension for vehicle frames comprising in combination a plurality of wheel-carrying levers mounted each to swing in a vertical plane and disposed lengthwise of the frame, a plurality of springs each having one end connected to the free end of one of said levers, and an anchorage comprising an equalizing member journalled in the frame and disposed transversely of the longitudinal direction of the frame between its ends, which equalizing member carries radial arms terminating one at each side of the frame and anchored to the free ends of the springs.

2. A spring-suspension for vehicle frames comprising in combination a plurality of wheel-carrying levers mounted each to swing in a vertical plane and disposed lengthwise of the frame, a plurality of coil springs each having one end connected to the free end of one of said levers, a horizontal rock-shaft journalled transversely in the frame, and two radial arms carried by said shaft, one at each side of the frame and anchored to the free end of the springs.

3. A spring-suspension for vehicle frames comprising in combination a plurality of bell-crank levers each for supporting a wheel and disposed lengthwise of the frame, a horizontal rock-shaft journalled transversely in the frame, two radial arms carried by said shaft on the same side of the axis thereof, and situated one at each side of the frame, and connections, each comprising a coil spring, between the ends of the radial arms and the free ends of said levers.

4. A spring-suspension for vehicle frames comprising in combination a plurality of bell-crank levers each for supporting a wheel and disposed lengthwise of the frame, a horizontal rock-shaft journalled transversely in the frame, two radial arms carried by said shaft and situated one at each side of the frame, connections, each comprising a coil spring, between the ends of the raidial arms and the free ends of said levers, and two coil springs connected at one end each to one of said arms, and at the other end to the frame.

In testimony whereof I affix my signature.

JOSEPH REGINALD MONTAGUE STANFIELD.